United States Patent Office 3,325,385
Patented June 13, 1967

3,325,385
PREPARATION OF A GRAFT COPOLYMER OF ACRYLONITRILE MONOMER ONTO A WATER-WET NITROCELLULOSE POLYMER
Frederick J. Keene, Medford Lakes, N.J., and John A. Parkins, Newark, Del., assignors to E. I. du Pont de Nemours and Company, Wilmington, Del., a corporation of Delaware
No Drawing. Filed Nov. 29, 1961, Ser. No. 155,843
1 Claim. (Cl. 204—159.12)

This invention relates to modified nitrocellulose and more specifically to nitrocellulose which has been modified by reaction with vinyl monomers.

Nitrocellulose has been used for many years for coating cellophane to make it moistureproof, as the film forming ingredient in lacquers for metal and wood, as protective coatings for books, as photographic film, and for many other uses. In most of these uses the properties of nitrocellulose could be improved in several respects; such as, water vapor transmission rate, organic solvent resistance, and particularly in resistance to degradation, i.e., discoloration, caused by sunlight and ultraviolet light. The present invention provides a method for improving nitrocellulose in these respects.

In accordance with this invention nitrocellulose is modified by a process which comprises forming a workable aqueous slurry of nitrocellulose, adding at least about 0.05% based on the total weight of nitrocellulose, of acrylonitrile monomer, and reacting the resultant mixture at a temperature of from about 0° C. to about 100° C. The amount of monomer combined with the nitrocellulose can be increased by exposing the nitrocellulose to high energy radiation either before or during exposure to vinyl monomer which may be used in either the liquid state or the vapor state. The source of radiation used may vary widely. Ultraviolet radiation from an ultraviolet or sunlamp may be used. Nuclear particles such as electrons, protrons, neutrons, or higher energy radiation such as gamma rays or X-rays may be used in this process. The preferred source of radiation is an electron accelerator giving electrons having energies between 500,000 and 10 million electron volts.

When particle radiation is used, the effective dose lies between 0.2 and 125 watt-seconds per square centimeter and the preferred range is from 5 to 25 watt-seconds per square centimeter. More than 125-watt-seconds per square centimeter leads to excessive homopolymerization of the monomer and excessive degradation of the nitrocellulose.

The intensity of the ultraviolet light used as the radiation is not critical. The presence of any ultraviolet light will increase the amount of monomer combined with the nitrocellulose over that combined in an equal time with no radiation. In general, the intensity of ultra-violet light received by a surface one foot away from a 275-watt sun-lamp will be sufficient to allow combination of a significant amount of monomer with nitrocellulose in 10 to 30 minutes.

The type of nitrocellulose used in the practice of this invention is not critical except that it must be a soluble grade of nitrocellulose. Soluble nitrocelluloses are those having a nitrogen content from about 10 to about 13% and which are relatively soluble in alcohol-ether. Nitrocellulose is a polymer consisting of a group of β-D-glucopyranosyl units substituted to varying degrees with nitrate ester groups. As is the case with all polymers, nitrocellulose does not consist of homogeneous molecules but is a mixture of molecules substituted to a varying extent and having varying molecular weights. Each individual molecule is non-uniform in commercial nitrocellulose grades in that the individual glucopyranose units have from 0 to 3 nitrate ester groups which average 1.7 to 2.6 per glucopyranose unit. The molecular weight of the nitrocellulose can vary between wide limits; the preferred ranges are between a degree of polymerization of 100 units to more than 1500 units. Generally, soluble nitrocelluloses are below 700 units in degree of polymerization in order to provide concentrated solutions which do not have an excessive viscosity.

The reaction time will vary according to the reaction temperature and/or radiation dose and therefore is not an independent variable. In general, the time should be at least that necessary to combine at least 0.05% monomer with the nitrocellulose and no more than 6.5%. At room temperature, for example, in the absence of radiation the reaction time should be at least 1 hour and no more than 20 hours. At 100° the reaction time should be at least 2 minutes and no more than 30 minutes. When radiation is used the reaction time is defined by the time necessary to provide the proper radiation dose.

The temperature of the modifiaction reaction between nitrocellulose and vinyl monomer is not critical and may vary between 0° and 100° C. At temperatures lower than 0° C. the reaction time is excessively slow. Temperatures above 100°, on the other hand, lead to excessive degradation of the nitrocellulose. The preferred temperature range lies between 0° and 60° C.

The amount of monomer reacted with nitrocellulose in accordance with this invention may vary between 0.05% and 6.5% by weight based on the total weight of nitrocellulose used. More than 6.5% monomer can be reacted with nitrocellulose, but no significant advantages are gained thereby.

Vinyl monomers which can be used for modifying nitrocellulose to obtain improved properties are, for example, styrene, vinyl acetate, methyl methacrylate, acrylic acid, N-vinylcaprolactam, N-vinylpyrrolidone, butadiene, divinyl ether, methylcyclohexene, acrylonitrile, and many others.

The vinyl compounds particularly suitable for use in the present invention have the structure:

wherein $R_1$, $R_2$, and $R_3$ are hydrogen, or alkyl having from 1 to 13 carbon atoms, and $R_4$ is alkylene or substituted alkylene joined to $R_1$ to form a ring of 4 to 12 members or is cyano, carboxy, or carbalkoxy wherein the alkoxy group contains from 1 to 13 carbon atoms.

While we do not wish to be limited by theory we believe that the following reaction occurs when nitrocellulose and acrylonitrile for example, are reacted.

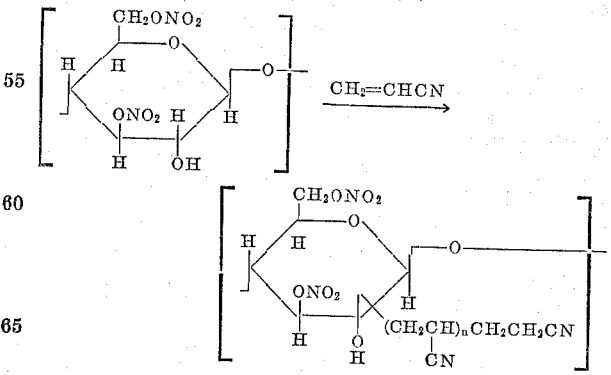

$n$ is an integer 0 or higher. While the nitrocellulose above is represented as a glucopyranosyl unit substituted by 2 nitrate ester groups in fixed locations, actually, industrial nitrocellulose is a combination of long chains of glucopyranosyl units having an average of about 2.1 nitrate ester groups per unit. The position of the nitrate groups is not identical for all monomer units, and some units will have no ester groups whereas other units will contain 3 nitrate ester groups.

The following examples, which are illustrative of and not meant to be a limitation of the invention, demonstrate actual embodiments of methods of carrying out the invention. Parts are by weight.

Example 1

Water-wet nitrocellulose (40 parts) containing 10.9–11.2% nitrogen and having a 3–4 sec. viscosity as measured according to ASTM Test D-301-56 at 20% concentration in a solution containing 55 parts of toluene, 25 parts ethanol, and 20 parts of 85% ethyl acetate is added to a mixture of 24 parts of acrylonitrile and 300 parts of water and agitated for two hours at room temperature. After washing the product with water, it is dried and cast into a film. This film has 5% better tensile strength and 5% better folding endurance, as compared with a film made from the starting nitrocellulose. The tensile strength is measured according to ASTM D-1530-58T and the folding endurance by ASTM D-643-43. In addition the modified film, after a 300 hour exposure to a RS275 watt ultraviolet sunlamp positioned 14″ from the film, has a yellowness index of 0.00646 as determined by Method 613.1 of the Federal Test Method Standards. After similar exposure, a control film made from unmodified nitrocellulose used as a starting material has a yellowness index of 0.03819. These figures indicate that the modified nitrocellulose yellows at a much lower rate than the unmodified notrocellulose and this is also evident by visual observation. When the modified nitrocellulose is applied as a coating for cellophane according to the method described by W. H. Charch and H. G. Scroggie (Paper Trade Journal, 101, No. 14, 31–9 (1935)) the water vapor transmission rate of resulting film is 8% lower than a corresponding film made using unmodified nitrocellulose. The lower water vapor transmission rate improves the properties of cellophane coated with the modified nitrocellulose for wrapping items of low moisture resistance.

Example 2

The procedure used in Example 1 is repeated using an eight-hour reaction time. The film formed by the resulting modified nitrocellulose has 10% better tensile strength, 25% better folding endurance, and an 8% lower moisture vapor transmission rate as a cellophane coating than has the control of unmodified nitrocellulose.

Example 3

Water-wet nitrocellulose (20 parts) of the same type described in Example 1 is dissolved in 200 parts of acrylonitrile. The solution is agitated and irradiated at 50° C. with an RS275-watt ultraviolet sunlamp 1 foot from the surface of the solution for 15 minutes. The modified nitrocellulose is precipitated in 1800 parts of water, washed with water, and dried. The cellophane coating made from this modified nitrocellulose exhibits a 5% reduction in water vapor transmission over a control. After an exposure of 300 hours to a sunlamp, a film made from the modified nitrocellulose alone has a yellowness index of 0.00010 as compared to an index of 0.03819 for a film made from the starting material.

Example 4

The procedure described in Example 3 is used except that the reaction time is increased to 30 minutes. The water vapor transmission rate of a cellophane coating prepared from this modified nitrocellulose is reduced 22.8% as compared to a coating prepared from the starting material. After a 300 hour sunlamp exposure the yellowness index of a film made from the modified nitrocellulose alone is 0.00246 as compared to 0.03819 for a control film.

Example 5

Strips of film 1.4 mils thick are cast from the nitrocellulose described in Example 1. These samples are suspended by a wire above the surface of acrylonitrile contained in a beaker. The mouth of the beaker is covered with a vinylidine chloride polymer film and the nitrocellulose film is irradiated through the polyvinylidene chloride film with an RS275-watt ultraviolet sunlamp positioned 3 inches from the center of the nitrocellulose film. The temperature of the acrylonitrile is maintained at 66° C. providing an acrylonitrile vapor pressure of about 500 millimeters of mercury. After an exposure of the film to acrylonitrile vapor for a total of 30 minutes under these conditions the film has gained 1.4% in weight. The softening time of the modified film when placed in ethanol is 45 minutes as compared to 5 minutes for unmodified nitrocellulose film. The solution time in ethyl acetate for the modified film is 1 minute compared to 0.16 minute for the unmodified film. The increase in softening time is a measure of the improved resistance toward solvents shown by the modified nitrocellulose.

Example 6

The procedure of Example 5 was used except that the reaction time is increased to 3 hours to give a 3.9% weight gain. The softening time of the modified film in ethanol is greater than 5730 minutes as compared to a time of 5 minutes for the unmodified film and the solution time in ethyl acetate is 10 minutes as compared to a time of 0.16 minutes for the unmodified film.

Example 7

Water-wet nitrocellulose (25.5 parts) of the type described in Example 1 is sealed in a polyethylene bag together with 20 parts of acrylonitrile. The bag is then irradiated at 0° C. with electrons emitted from 2 million electron volt Van de Graaff electron accelerator. The total dose of electron irradiation is 12.5 watt-seconds/centimeter.$^2$ The modified nitrocellulose is then isolated by evaporating the excess acrylonitrile. A cellophane coating made from this nitrocellulose shows a 19.7% reduction in water vapor transmission rate as compared to a coating prepared from the starting material.

Example 8

Nitrocellulose of the same type described in Example 1 (13 parts) is sealed in a polyethylene bag with 20 parts acrylonitrile saturated with water at room temperature. This bag is irradiated with 2 million electron volt electrons from a Van de Graaff generator to a dose of 62.5 watt-sec./cm.$^2$ at 0° C. The product is washed with water, and dried. It contains 5.35% combined acrylonitrile.

Example 9

Nitrocellulose (20 parts) containing 11.8 to 12.2% nitrogen having the same viscosity as the nitrocellulose in Example 1 is treated as in Example 3. After a 300-hour exposure to a sunlamp the yellowness index of a film made from the modified nitrocellulose is 0.00947 compared to 0.02987 for a film made from the same nitrocellulose unmodified.

Example 10

Nitrocellulose as described in Example 1 (3 parts) is dissolved in ethyl acetate (27 parts) and 10 parts of 4-methylcyclohexene is added. The solution is exposed to a 275-watt sunlamp 12 inches from the solution surface through a polyvinylidine chloride film at room temperature with agitation for 24 hours. The solution is then poured into water to precipitate the nitrocellulose which is then washed with water and dried. Solutions are made from this modified nitrocellulose and the same nitrocelluose before modification and exposed to a 450-watt ultraviolet light having a radiation peak at 3400–3600 angstroms. The extent of yellowing of both solutions is measured by a null-point colorimeter having a 420-millimicron bypass filler. The relative life $$\left(\frac{\text{percent increase in yellow of control}}{\text{percent increase in yellow of test sample}}\right)$$

of the modified nitrocellulose is 1.54.

Example 11

The procedure of Example 10 is used substituting methyl methacrylate for 4-methylcyclohexene. The relative life of the modified cellulose from this experiment is 1.74.

The examples above describe many modifications of the invention. Many others will be apparent to those skilled in the art. We desire to be limited only by the following claim.

We claim:

A process for the preparation of a graft copolymer of acrylonitrile monomer onto a water-wet nitrocellulose polymer consisting essentially of the steps of forming a mixture of water-wet nitrocellulose having a nitrogen content of from about 10 to 13 percent and acrylonitrile monomer and irradiating the mixture with ultraviolet light for a period from between 10 to 30 minutes at a temperature from 0 to 100° C., the resulting graft copolymer having a yellowness index of not more than 0.00947 as measured after subjection of the graft copolymer to a 300-hour sun lamp exposure.

References Cited

UNITED STATES PATENTS

| | | | |
|---|---|---|---|
| 2,922,768 | 1/1960 | Mino et al. | 260—17 |
| 2,999,056 | 9/1961 | Tanner | 204—154 |
| 3,006,830 | 10/1961 | Cloninger et al. | 204—154 |
| 3,008,885 | 11/1961 | Talet | 204—154 |
| 3,044,972 | 7/1962 | Segro et al. | 260—17 |
| 3,088,791 | 5/1963 | Cline et al. | 204—154 |
| 3,101,276 | 8/1963 | Hendricks | 204—154 |

OTHER REFERENCES

Martin et al.: "Use of Radiation to Promote Chemical Reactions," Chem. and Eng. News, vol. 33, No. 14, Apr. 4, 1955, pp. 1424–1428.

Chapiro: "Radiation Chemistry of Polymeric Systems," p. 538, Interscience Publishers 1962.

Harwood et al.: "Effects of Radiation on Materials," Reinhold Pub. Corp., N.Y., 1958, p. 303.

Chapiro et al.: "Intern J. Appl. Radiation and Isotopes," vol. 8, pp. 164–170, 1960.

Talet: Chem. and Ind. (Paris), vol. 79, pp. 600 to end of article (1958).

SAMUEL H. BLECH, *Primary Examiner.*

MURRAY TILLMAN, *Examiner.*

R. B. TURNER, N. F. OBLON, *Assistant Examiners.*